US011217879B2

United States Patent
Liu

(10) Patent No.: US 11,217,879 B2
(45) Date of Patent: Jan. 4, 2022

(54) ANTENNA ASSEMBLY AND ELECTRONIC DEVICE USING SAME

(71) Applicant: AAC Technologies Pte. Ltd., Singapore (SG)

(72) Inventor: Feng Liu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/936,412

(22) Filed: Jul. 22, 2020

(65) Prior Publication Data

US 2020/0411955 A1 Dec. 31, 2020

Related U.S. Application Data

(63) Continuation of application No. PCT/CN2019/093346, filed on Jun. 27, 2019.

(51) Int. Cl.
*H01Q 1/24* (2006.01)
*H04M 1/02* (2006.01)

(52) U.S. Cl.
CPC ............ *H01Q 1/243* (2013.01); *H04M 1/026* (2013.01)

(58) Field of Classification Search
CPC .............................. H01Q 1/243; H04M 1/0266
See application file for complete search history.

(56) References Cited

U.S. PATENT DOCUMENTS

| 2011/0032157 A1* | 2/2011 | Suh .................... H01Q 5/371 343/702 |
| 2018/0123234 A1* | 5/2018 | Wang ..................... H01Q 9/42 |
| 2020/0076080 A1* | 3/2020 | Liu ........................ H01Q 21/28 |
| 2020/0321688 A1* | 10/2020 | Khripkov ............... H01Q 1/243 |
| 2020/0412412 A1* | 12/2020 | Su .............................. H01Q 1/38 |

FOREIGN PATENT DOCUMENTS

| CA | 2287329 A1 * | 8/1999 | ............. H01Q 1/526 |
| EP | 3324484 A1 * | 5/2018 | ............. H01Q 13/10 |
| WO | WO-2019209285 A1 * | 10/2019 | ............. H01Q 1/243 |

* cited by examiner

*Primary Examiner* — Lewis G West
(74) *Attorney, Agent, or Firm* — W&G Law Group

(57) ABSTRACT

The present application provides an antenna assembly and an electronic device. The antenna assembly includes a plastic housing, a frame body and a circuit board arranged in the frame body, wherein the frame body includes a middle frame and an outer metal frame surrounding the edge of the middle frame and connected with the middle frame. The plastic housing covers the outer side of the outer metal frame. A number of gaps are arranged on the outer metal frame. The present application can randomly set the positions of the gaps as described in requirements of an antenna structure, then the performance of the antennas can be ensured, and the attractiveness is not affected.

4 Claims, 6 Drawing Sheets

ANTENNA ASSEMBLY AND ELECTRONIC DEVICE USING SAME

FIELD OF THE PRESENT DISCLOSURE

The present application relates to the field of communication technologies, and in particular to an antenna assembly and an electronic device using such an antenna assembly.

DESCRIPTION OF RELATED ART

With the development of electronic communication technology, mobile terminals such as mobile phones and tablet computers are becoming increasingly popular. However, the appearance or texture of the mobile terminals and the antenna performance of the mobile terminals are mutually restricted. The conventional design is to form a slit in a metal frame of a mobile terminal to take the metal frame as an antenna. In order to ensure the performance of the antenna, the metal frame needs to be provided with the slit, and accordingly the appearance attractiveness is badly affected.

Therefore, it is necessary to provide an antenna assembly that does not affect the appearance attractiveness while the performance of the antenna is not affected.

SUMMARY OF THE INVENTION

One of the main objects of the invention is to provide an antenna assembly used in an electronic device without affecting the appearance attractiveness.

In order to achieve the object mentioned, the present invention provides an antenna assembly, comprising: a frame body having a middle frame and an outer metal frame surrounding and connecting to an edge of the middle frame; a plurality of gaps disposed in the outer metal frame; a plastic housing covering an outer side of the outer metal frame; and a circuit board arranged in the frame body. The gaps divide the outer metal frame to form a plurality of antennas. The circuit board includes a plurality of feeding parts; and the plurality of the antennas are respectively electrically connected with the circuit board through the plurality of the feeding parts.

In addition, the antenna assembly further comprises fillers filled in the gaps.

In addition, the plastic housing is integrally formed with the fillers.

In addition, an amount of the gaps is two, and the gaps divide the outer metal frame into a diversity antenna and a 3-in-1 antenna.

In addition, the outer metal frame comprises a first frame, a second frame, a third frame and a fourth frame connected from head to end in sequence, the first frame and the third frame are oppositely arranged, the second frame and the fourth frame are oppositely arranged, and the two gaps are respectively arranged in the first frame and the second frame.

In addition, the antenna assembly further comprises first metal domes and second metal domes; wherein the feeding part comprises a first feeding part and a second feeding part; the circuit board further includes a grounding part and a tuning switch circuit; the diversity antenna is electrically connected with the first feeding parts and the tuning switch circuit respectively through two of the first metal domes; the 3-in-1 antenna is electrically connected with the second feeding part and the grounding part respectively through the two second metal domes.

The invention further provides an electronic device including an antenna assembly as mentioned above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
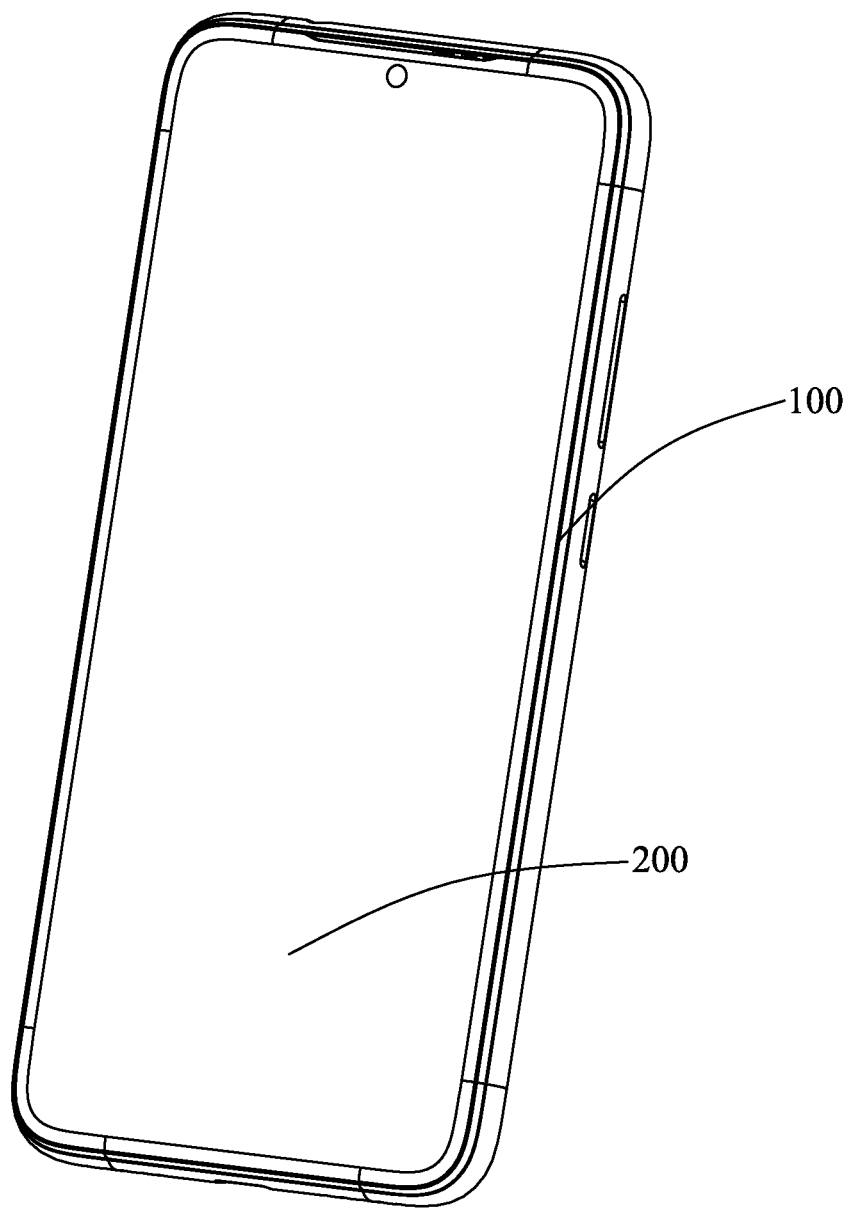
FIG. 1 is an illustration of an electronic device in accordance with an exemplary embodiment of the present invention.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

It should be noted that all directional indicators (such as upper, lower, left, right, front, rear, top, bottom, etc.) in the embodiment of the present application are only used to explain the relative positional relationship between various components under a certain posture (as shown in the drawings), etc. If the specific posture changes, the directional indicator will also change accordingly.

It should also be noted that when an element is referred to as being "fixed" or "disposed" on another element, the element may be directly on the other element or there may be intervening elements at the same time. When an element is called "connected" to another element, it may be directly connected to the other element or there may be intervening elements at the same time.

As shown in FIG. 1, an antenna assembly 100 provided by an embodiment of the present application is applied to an electronic device, such as a cell phone and a tablet computer light. The electronic device comprises an antenna assembly 100 and a cover plate 200 installed in cooperation with the antenna assembly 100.

Figure 2:
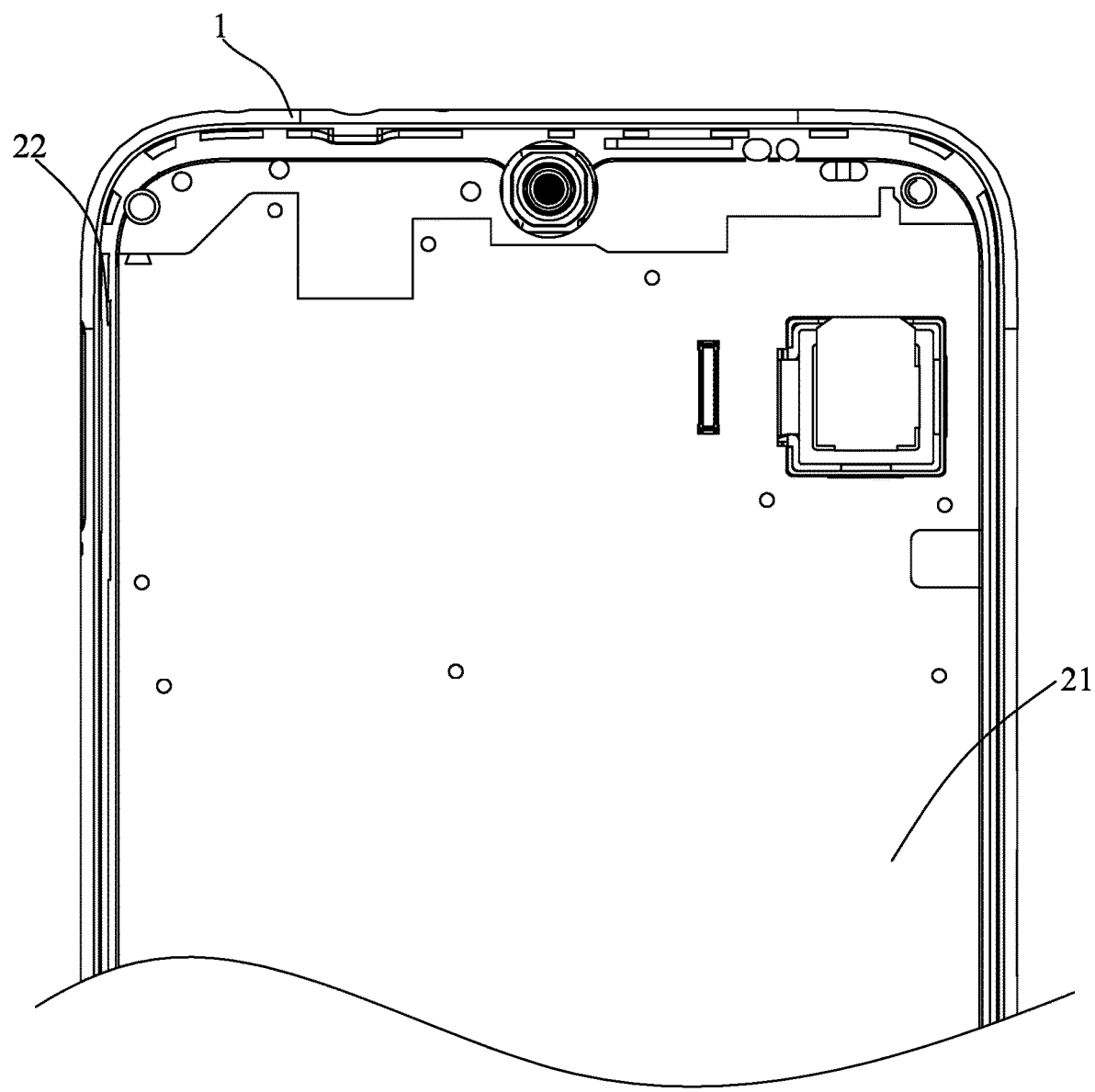
FIG. 2 is a front view of an antenna assembly of the electronic device in FIG. 1.
Figure 3:
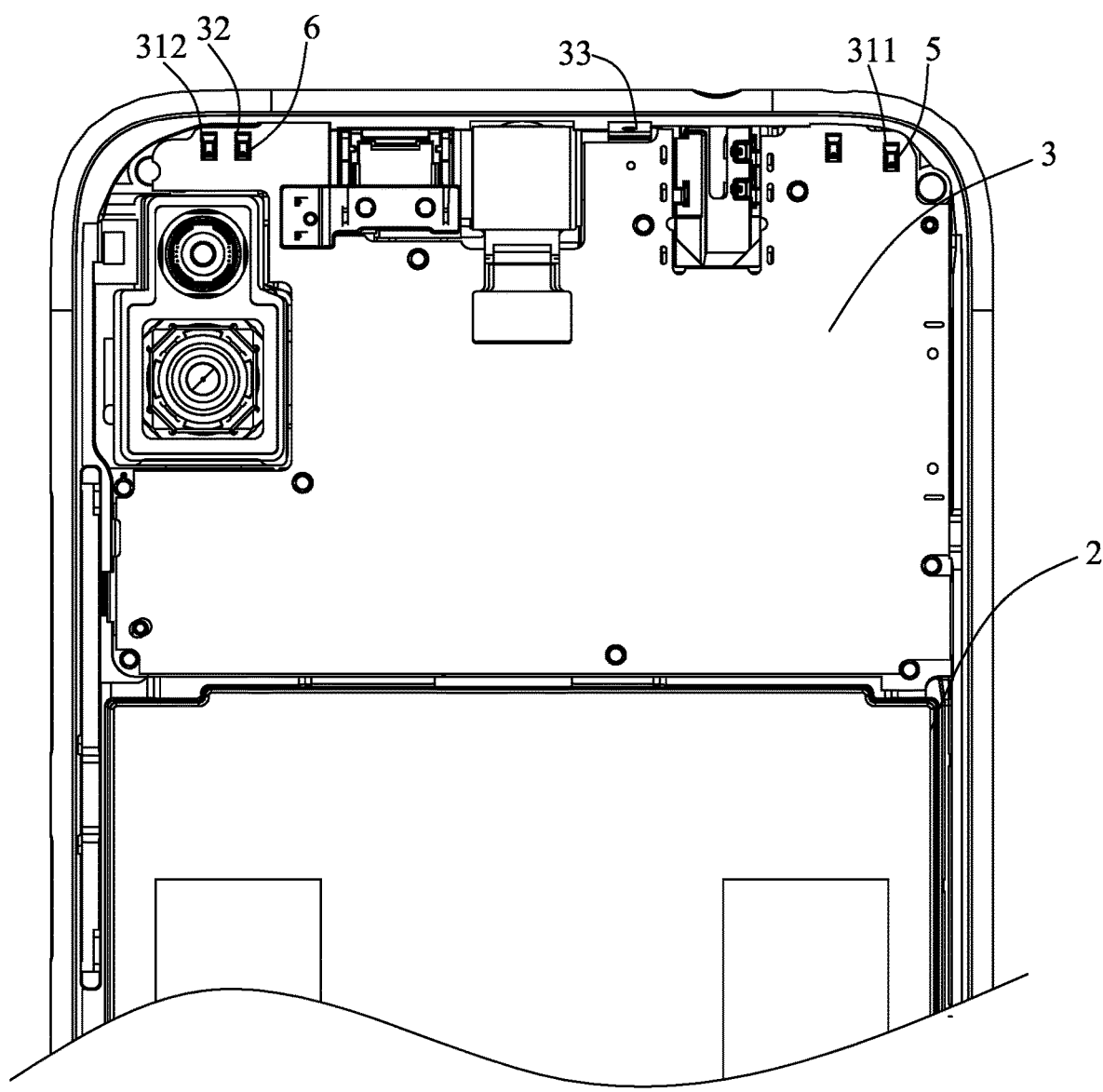
FIG. 3 is a back view of the antenna assembly in FIG. 2.
Figure 4:
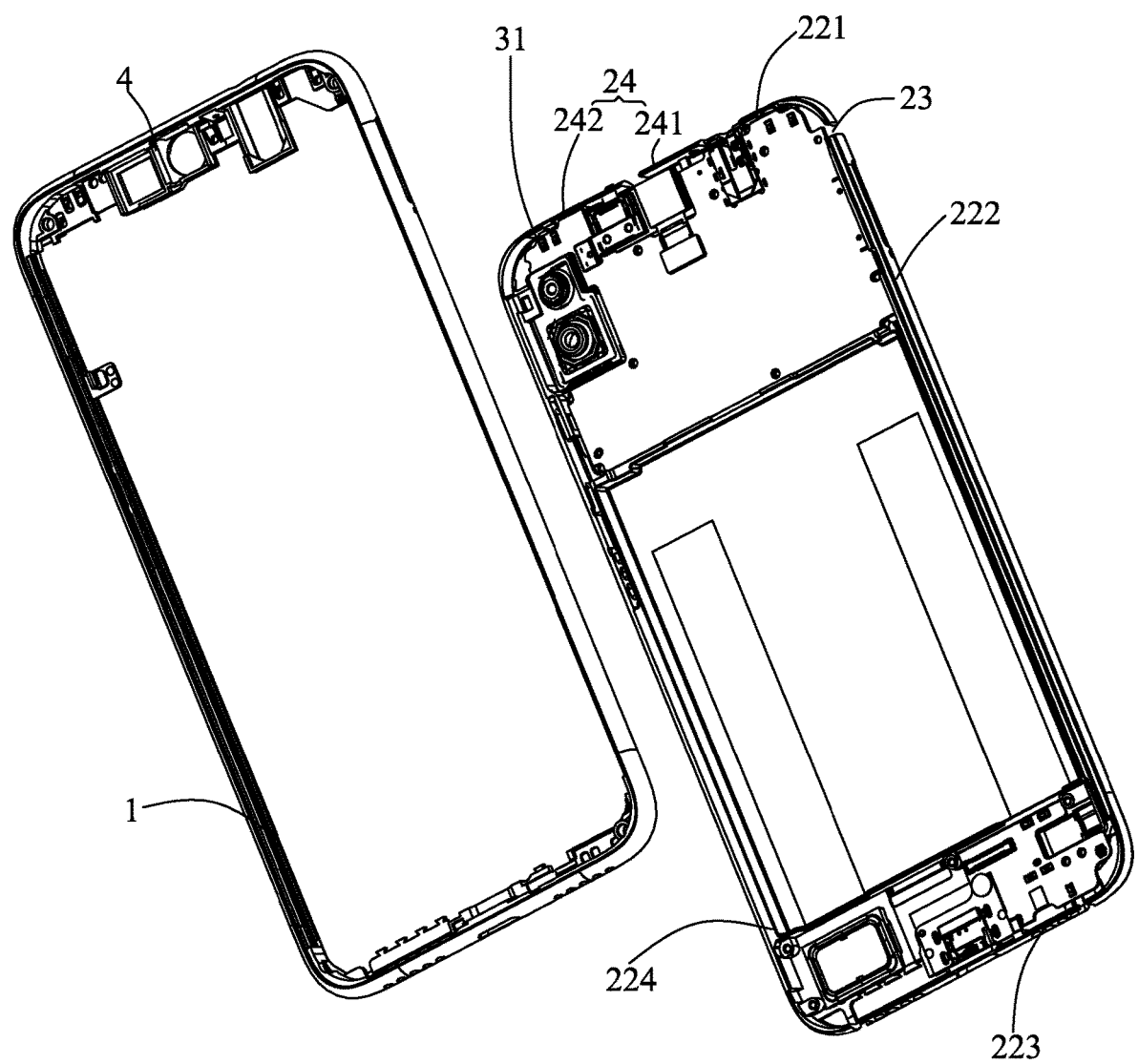
FIG. 4 is an exploded view of the antenna assembly in FIG. 2.

As shown in FIGS. 2-4, the antenna assembly 100 provided by the embodiment of the present application comprises a plastic housing 1, a frame body 2 and a circuit board 3 arranged in the frame body 2. The frame body 2 comprises a middle frame 21 and an outer metal frame 22 surrounding the edge of the middle frame 21 and connected to the middle frame 21. The plastic housing 1 covers the outer side of the outer metal frame 22. The outer metal frame 22 is provided with a plurality of gaps 23, and the gaps 23 divide the outer metal frame 22 to form a plurality of antennas 24. The circuit board 3 is provided with a plurality of feeding parts 31, and the plurality of the antennas 24 are respectively electrically connected with the circuit board 3 through the plurality of the feeding parts 31. By wrapping the plastic housing 1 on the outer side of the outer metal frame 22, the gaps 23 can be formed in any position of the outer metal frame 22, and the plastic housing 1 has a seamless structure, so that the appearance attractiveness of the electronic device will not be affected by the gaps 23.

In one embodiment, the antenna assembly 100 further comprises fillers 4 filled in the gaps 23, and the fillers 4 extend between the outer metal frame 22 and the circuit board 3 to prevent dust from entering the gaps 23 and improve the connection strength between the circuit board 3 and the middle frame 21. Preferably, the plastic housing 2 and the fillers 4 are integrally formed to simplify processing technology. It is understood that the fillers 4 and the plastic housing 2 can also be two separate components.

In one embodiment, the amount of the gaps 23 is two, and the gaps 23 divide the outer metal frame 22 into a diversity antenna 241 and a 3-in-1 antenna 242. The 3-in-1 antenna 242 includes a GPS antenna, a WIFI-2.4G antenna and a WIFI-5G antenna. The outer metal frame 22 comprises a first frame 221, a second frame 222, a third frame 223 and a fourth frame 224 which are connected end to end in sequence, the first frame 221 and the third frame 223 are oppositely arranged, the second frame 222 and the fourth frame 224 are oppositely arranged, and the two gaps 23 are respectively arranged on the first frame 221 and the second frame 222. Specifically, one of the gaps 23 is disposed at the middle of the first frame 221, and the other gap 23 is disposed at one end of the second frame 222 near the first frame 221.

In one embodiment, the antenna assembly 100 further comprises a first metal domes 5 and second metal domes 6, and the feeding part 31 comprises a first feeding part 311 and a second feeding part 312. The circuit board 3 is also provided with a grounding part 32 and a tuning switch circuit 33, and the diversity antenna 241 is electrically connected with the first feeding part 311 and the tuning switch circuit 33 through two first metal domes 5 respectively. The 3-in-1 antenna 242 is electrically connected to the second feeding part 312 and the grounding part 32 through two second metal domes 6, respectively, thus ensuring the reliability of connection between the diversity antenna 241 and the 3-in-1 antenna 242 with the circuit board 3. Among them, the tuning switch circuit 33 can be switched between different working states, and working frequencies for controlling the antennas to work at different working states are different.

Figure 7:
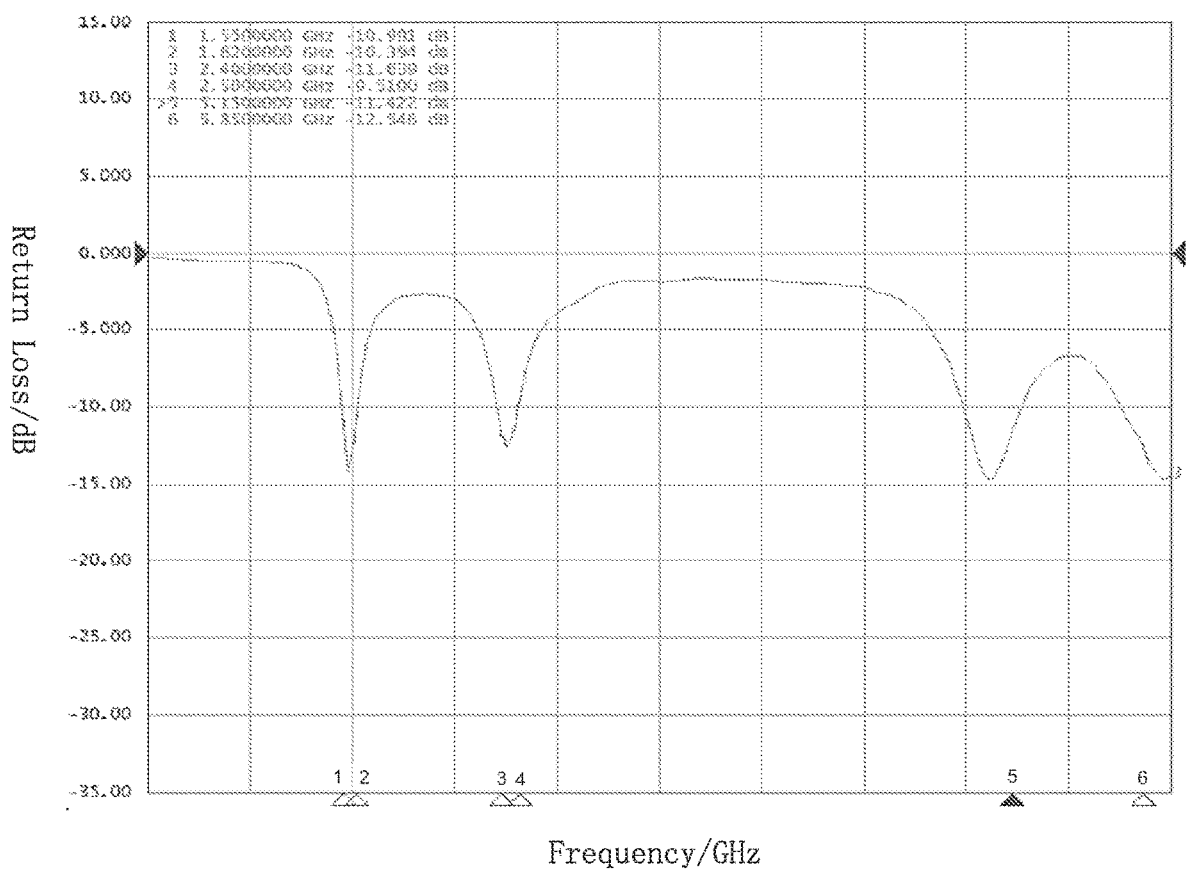
FIG. 7 shows the return loss of a 3-in-1 antenna of the antenna assembly.
Figure 8:
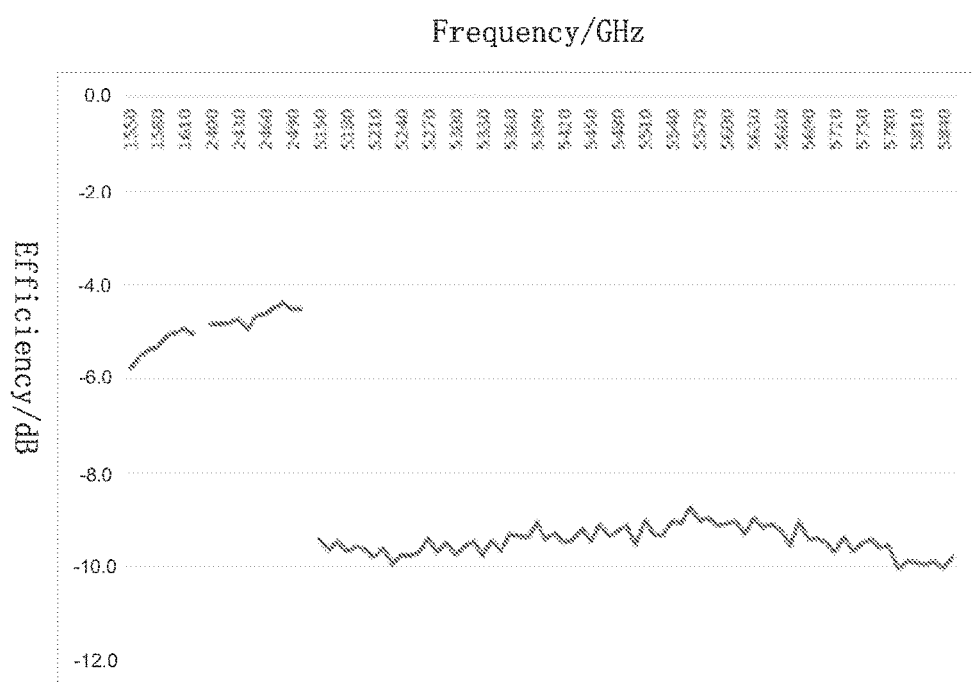
FIG. 8 shows the efficiency of 3-in-1 antenna of the antenna assembly.
Figure 5:
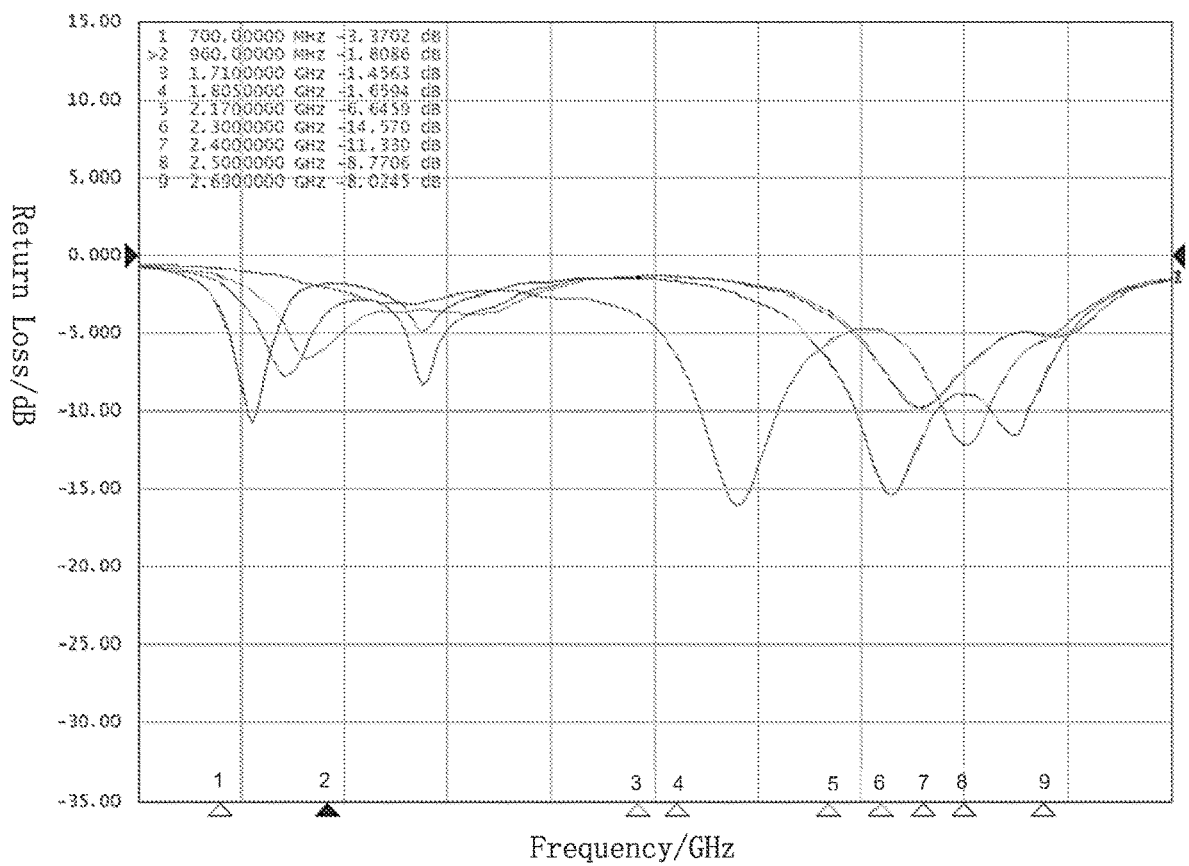
FIG. 5 shows the return loss of a diversity antenna of the antenna assembly.
Figure 6:
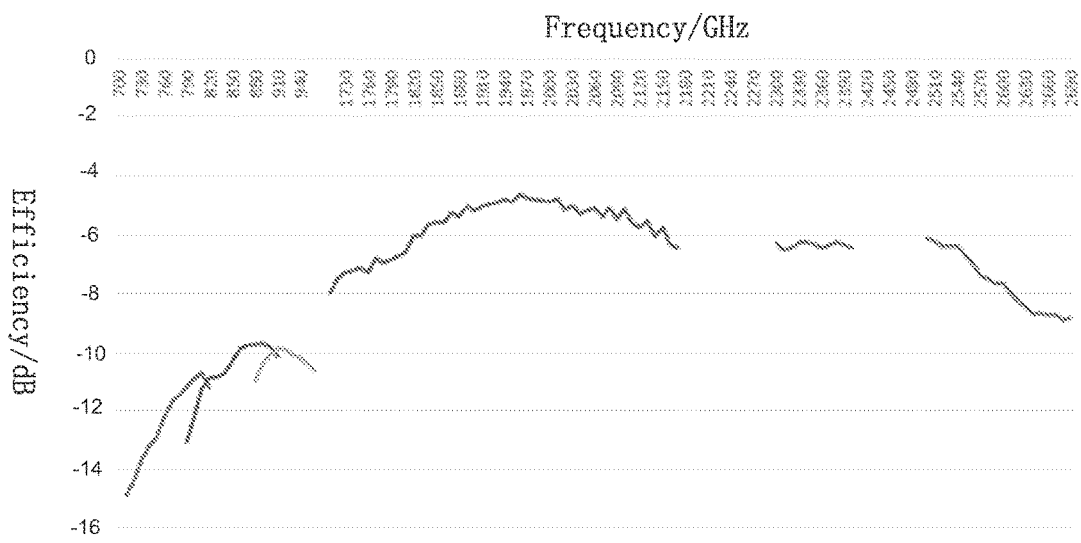
FIG. 6 shows the efficiency of the diversity antenna of the antenna assembly.

The return loss of the diversity antenna is shown in FIG. 5, the efficiency of the diversity antenna is shown in FIG. 6, the return loss of the 3-in-1 antenna is shown in FIG. 7, and the efficiency of the 3-in-1 antenna is shown in FIG. 8. It can be seen that the antenna assembly provided by the embodiment makes full use of the radiated return energy and reduces the return loss of the antenna assembly.

According to the antenna assembly 100 and the electronic device provided by the present application, the outer side of the outer metal frame 22 is coated by the plastic housing 1, the gaps 23 are arranged in the outer metal frame 22, and the outer metal frame 22 is divided into the plurality of the antenna 24, so that the positions of gaps 23 can be arbitrarily set according to the requirements of an antenna structure, the performance of the antennas can be ensured, and the attractiveness is not affected.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An antenna assembly, comprising:
   a frame body having a middle frame and an outer metal frame surrounding and connecting to an edge of the middle frame;
   a plurality of gaps disposed in the outer metal frame;
   a plastic housing covering an outer side of the outer metal frame;
   a circuit board arranged in the frame body; wherein
   the gaps divide the outer metal frame to form a plurality of antennas;
   the circuit board includes a plurality of feeding parts; and
   the plurality of the antennas are respectively electrically connected with the circuit board through the plurality of the feeding parts;
   an amount of the gaps is two, and the gaps divide the outer metal frame into a diversity antenna and a 3-in-1 antenna;
   the outer metal frame comprises a first frame, a second frame, a third frame and a fourth frame connected from head to end in sequence, the first frame and the third frame are oppositely arranged, the second frame and the fourth frame are oppositely arranged, and the two gaps are respectively arranged in the first frame and the second frame;
   the antenna assembly still comprise first metal domes and second metal domes; the feeding part comprises a first feeding part and a second feeding part; the circuit board further includes a grounding part and a tuning switch circuit; the diversity antenna is electrically connected with the first feeding parts and the tuning switch circuit respectively through two of the first metal domes; the 3-in-1 antenna is electrically connected with the second feeding part and the grounding part respectively through the two second metal domes.

2. The antenna assembly as described in claim 1, further comprising fillers filled in the gaps.

3. The antenna assembly as described in claim 2, wherein the plastic housing is integrally formed with the fillers.

4. An electronic device including an antenna assembly as described in claim 1.

* * * * *